(12) United States Patent
Nakanishi

(10) Patent No.: US 7,457,812 B2
(45) Date of Patent: Nov. 25, 2008

(54) SYSTEM AND METHOD FOR MANAGING STRUCTURED DOCUMENT

(75) Inventor: Motoki Nakanishi, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 226 days.

(21) Appl. No.: 11/080,822

(22) Filed: Mar. 16, 2005

(65) Prior Publication Data

US 2006/0106831 A1    May 18, 2006

(30) Foreign Application Priority Data

Oct. 29, 2004   (JP)   ............. 2004-316109

(51) Int. Cl.
G06F 17/30 (2006.01)
G06F 7/00 (2006.01)

(52) U.S. Cl. ..................................... 707/101

(58) Field of Classification Search .............. 707/101
See application file for complete search history.

(56) References Cited

U.S. PATENT DOCUMENTS

| | | | |
|---|---|---|---|
| 6,654,737 B1* | 11/2003 | Nunez | 707/3 |
| 2001/0007987 A1* | 7/2001 | Igata | 707/3 |
| 2003/0221168 A1* | 11/2003 | Kozlov | 715/513 |
| 2005/0050059 A1* | 3/2005 | Van Der Linden et al. | 707/100 |

FOREIGN PATENT DOCUMENTS

| | | |
|---|---|---|
| CN | 1170240 C | 10/2004 |
| JP | 7-271813 | 10/1995 |
| JP | 8-44766 | 2/1996 |
| JP | 2003-157249 | 5/2003 |
| JP | 2003-288365 | 10/2003 |

OTHER PUBLICATIONS

Jiang et al. "Path Materialization Revisited: An Efficient Storage Model for XML Data", Australian Computer Science Communications, Proceedings of the 13th Australasian database conference—Vol. 5 ADC '02, Vol. 24 Issue 2, Jan 2002 Publisher: Australian Computer Society, Inc., IEEE Computer Society Press.*
T. Iizuka, XML, data store perfect guide, XML Magazine, Japan, Kabushiki Kaisha Syoeisya, 7(6):29-39 (Apr. 1, 2001).

(Continued)

*Primary Examiner*—Kuen S Lu
(74) *Attorney, Agent, or Firm*—Finnegan, Henderson, Farabow, Garrett & Dunner, L.L.P.

(57) ABSTRACT

A structured document management system manages a structured document database. This system includes a parse processing unit which parsing a structured document to be stored in accordance with a structured document storage request made by a client, a structured document storing unit which stores parsed data obtained by parsing the structured document in the structured document database, a structured document acquiring unit which acquires parsed data corresponding to data of a structured document, which meets to a structured document acquisition request made by the client, from the structured document database, and a request processing unit which returns the parsed data acquired by the structured document acquiring unit to the client.

13 Claims, 11 Drawing Sheets

OTHER PUBLICATIONS

Office Action with English Translation for Patent Application No. 2004-316109, dated Dec. 11, 2007.

Decision of Rejection from the Japan Patent Office with English Translation for Patent Application No. 2004-316109, mailed Apr. 1, 2008.

Notification of the first Office Action from the China Patent Office with English Translation for Patent Application No. CN 20050064603.09, mailed Mar. 7, 2008.

* cited by examiner

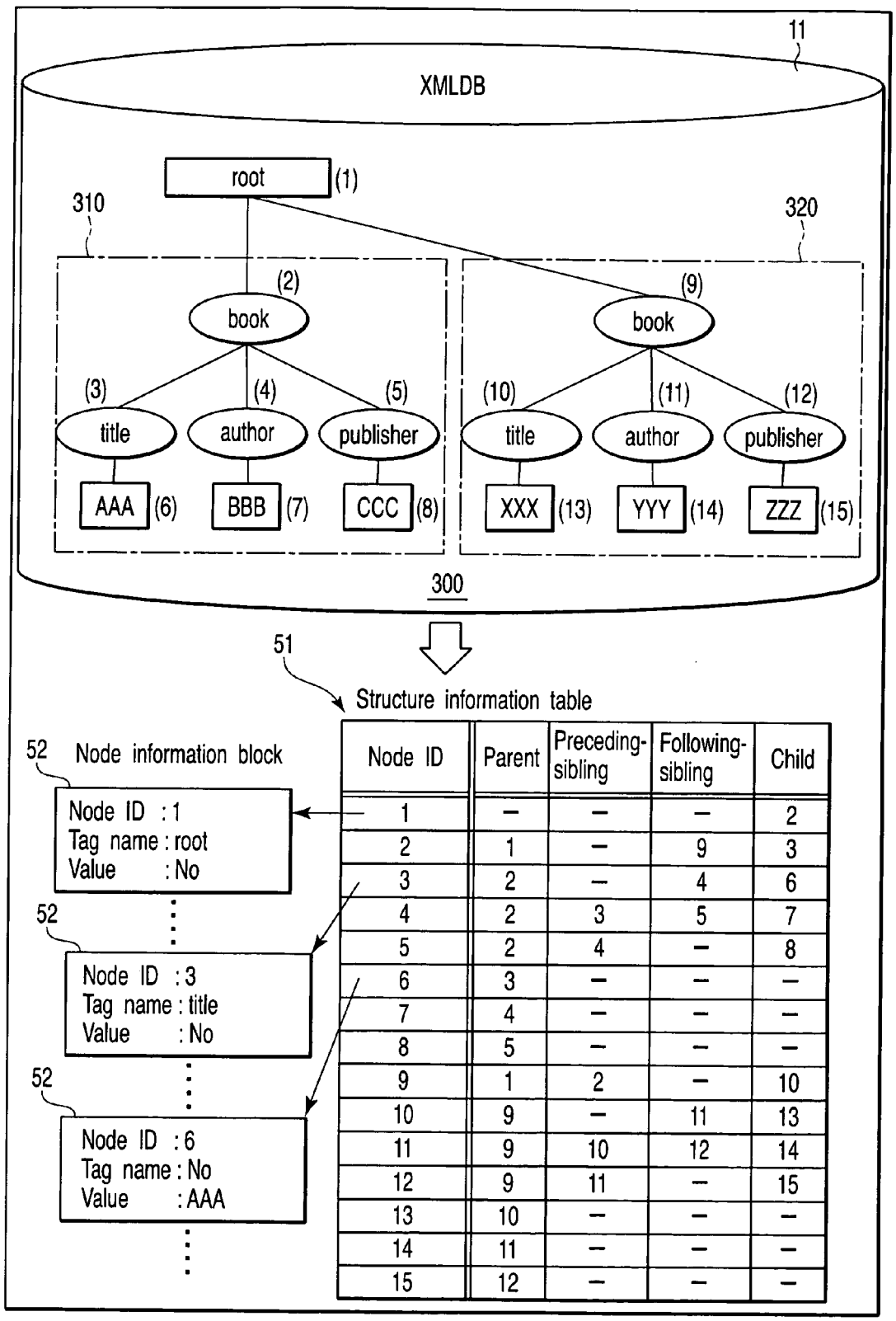
F I G. 6

SYSTEM AND METHOD FOR MANAGING STRUCTURED DOCUMENT

CROSS-REFERENCE TO RELATED APPLICATIONS

This application is based upon and claims the benefit of priority from prior Japanese Patent Application No. 2004-316109, filed Oct. 29, 2004, the entire contents of which are incorporated herein by reference.

BACKGROUND OF THE INVENTION

1. Field of the Invention

The present invention relates to a system and method for managing a structured document such as an extensible markup language (XML) document. More specifically, the invention relates to a structured document management system, structured document management method and program for managing structured document database.

2. Description of the Related Art

A document having a logical structure is generally called a structured document. This logical structure is represented by tags described in the document. Such a structure document is suitable to be processed by a computer.

An extensible markup language (XML) is widely used as language for describing the structured document using tags. The XML has the advantages that data can hierarchically be structured by significant tags and the structure can freely be extended. A document described with the XML is called an XML document. The XML document is known as a typical structured document that is logically represented by a tree structure using the tags.

The XML document is generally stored as a plain-text-format file. In most cases, one XML document is described in one file; therefore, a plurality of XML documents are stored as their respective text-format files.

A database that is capable of storing an XML document with the advantages of the XML and retrieving an arbitrary logical structure (document structure) or an arbitrary element from the XML document is called an XML database (XMLDB). Software that manages the XMLDB is called an XMLDB management system (XMLDBMS). In the conventional XMLDBMS, generally, an XML document is stored in the XMLDB in text format as it is or in binary format unique to the system. The XMLDB adopting such an XML document storing method inherits a storage structure that the original XML documents are separated into their respective files. The XML documents are therefore stored in, e.g., text format while being separated from each other.

When an XMLDB adopting the XML document storing method is retrieved from an application running on a client's terminal, an XML document is generally obtained in text format as a result of the retrieval. In an XMLDB that stores an XML document in unique binary format, the XML document as a result of the retrieval can be returned in the binary format. However, the binary-format data becomes difficult to process afterward on the application side. In general, the XMLDBMS converts the binary-format XML document, which is retrieved from the XMLDB, into a text-format one and returns it to the application. In other words, the XML document retrieved from the XMLDB is returned to the application in text format when it is stored in unique binary format as well as in text format.

The application hardly uses the returned text-format XML document as it is. Most of applications that process XML documents parse an acquired text-format XML document into parsed data using an XML processor (XML parser). The parsed data is set in format available for the applications. Concurrently with this parse process, the XML parser verifies whether the XML document is described in conformity with the syntax of XML. The parse process becomes a heavy load on the applications depending on the contents and volume of the XML document.

When the results of retrieval are included in a plurality of XML documents in the XMLDB, the XML documents which are obtained as the results of the retrieval are separated into their respective files. The reason is that the storage structure of the XML documents in the XMLDB is inherited from that of the original XML documents. The process of retrieving and updating data of the XML documents stored in the XMLDB is performed file by file, and the application always needs to pay attention to each of the files.

Jpn. Pat. Appln. KOKAI Publication No. 2003-157249 (paragraphs 0003 and 0013) discloses a method of converting a set of XML documents into a document object model (DOM) set and storing it in an XMLDB. Adopting this storing method, an application need not always pay attention to each of files in performing a process of retrieving and updating data of the XML documents stored in the XMLDB.

Conventionally, an XML document is stored in the XMLDB in text format or in unique binary format as described above. In order for a client (an application running on a client) to retrieve the XML document and use it, it needs to be parsed by the client (or XMLDBMS).

There is a possibility that the parse process will become a heavy load on the client (or XMLDBMS) in terms of its property. Since the parse process is required each time an XML document is retrieved, there is a possibility that the client will have to bear a large cost for the parse process. In a process of updating an XML document stored in the XMLDB, when the range to be updated is data of part of the XML document, the XML document needs to be parsed again to update the data, and its format needs to be returned to the original one.

BRIEF SUMMARY OF THE INVENTION

According to an embodiment of the present invention, there is provided a structured document management system which manages a structured document database, comprising parsing means for parsing a structured document to be stored in accordance with a structured document storage request made by a client, structured document storing means for storing parsed data obtained by parsing the structured document in the structured document database, structured document acquiring means for acquiring parsed data corresponding to data of a structured document, which meets to a structured document acquisition request made by the client, from the structured document database, and request processing means for returning the parsed data acquired by the structured document acquiring means to the client.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a diagram showing an example of a data structure of the XMLDB shown in FIG. 4;

DETAILED DESCRIPTION OF THE INVENTION

Embodiments of the present invention will be described with reference to the accompanying drawings.

First Embodiment

Figure 1:
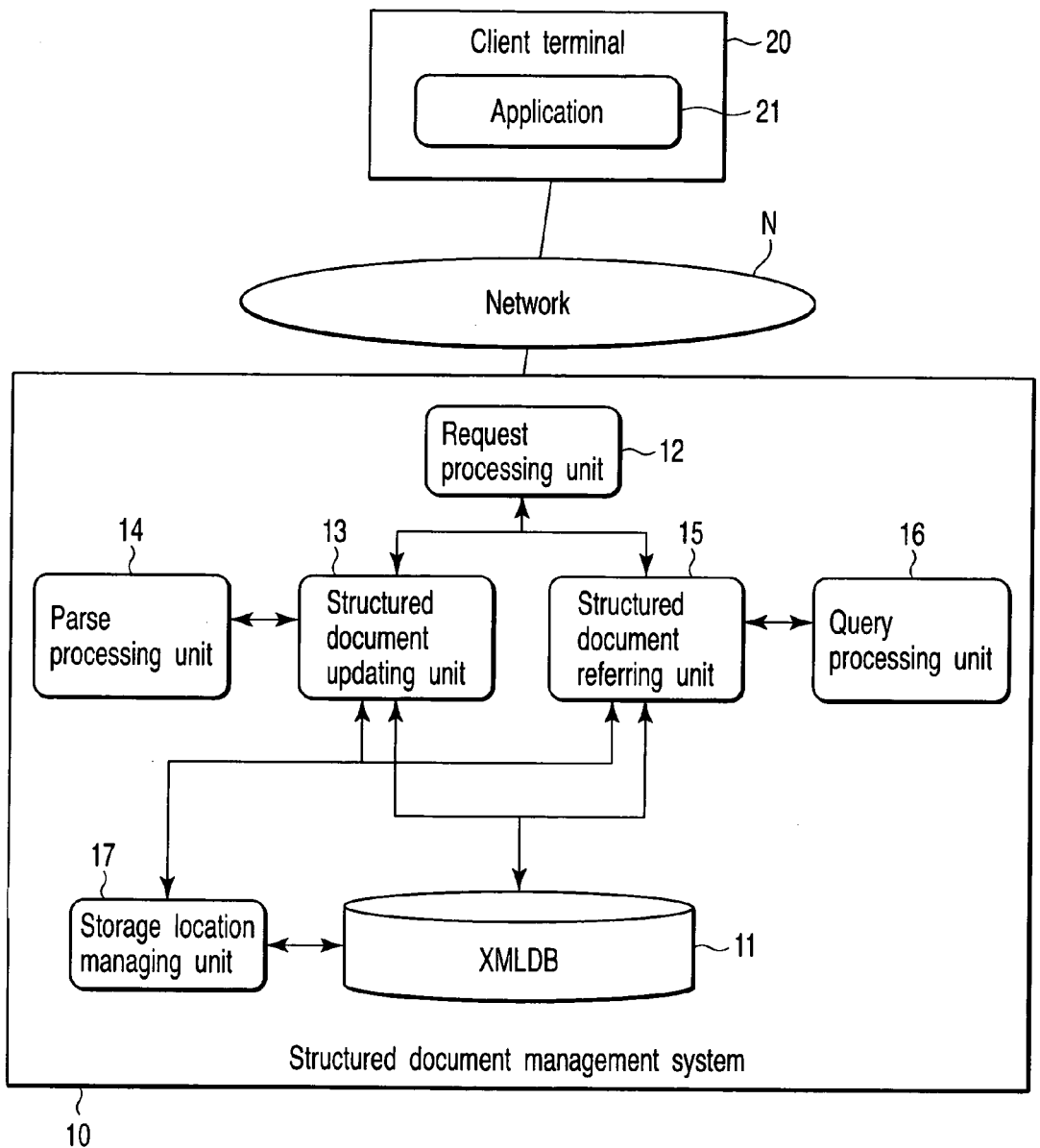
FIG. 1 is a block diagram showing a configuration of a structured document management system according to a first embodiment of the present invention.

FIG. 1 is a block diagram showing a configuration of a structured document management system 10 according to a first embodiment of the present invention. This system 10 is connected to a client's terminal 20 via a network N such as a local area network (LAN). An application (application program) 21 using the system 10 runs on the client's terminal 20. The system 10 includes an XML database (XMLDB) 11, a request processing unit 12, a structured document updating unit 13, a parse processing unit 14, a structured document referring unit 15, a query processing unit 16 and a storage location managing unit 17.

The XMLDB 11 is a database (structured document database) for storing XML documents as structured documents. The XMLDB 11 stores parsed data that is obtained by parsing an XML document. Note that the XML document is not stored in the XMLDB 11 in text format or binary format unique to the system, as will be described in detail later.

The request processing unit 12 receives a request from the application 21 on the client's terminal 20 and analyzes the request. If the analyzed request is one to store an XML document, the structured document updating unit 13 stores in the XMLDB 11 the parsed data that is obtained by parsing the XML document requested by the application 21. The storage format of XML documents in the XMLDB 11 will be described later. If the above analyzed request is a parsed data change request, the unit 13 updates the original parsed data in the XMLDB 11 to parsed data that is obtained by parsing the XML document changed by the application 21.

The parse processing unit 14 parses an XML document requested by the structured document updating unit 13. If the analyzed request by the unit 12 is one to retrieve an XML document, the structured document referring unit 15 uses the query processing unit 16 and storage location managing unit 17 to acquire information of a storage location in the XMLDB 11 including the parsed data corresponding to data of an XML document that meets the requested retrieval condition. If the analyzed request is one to acquire parsed data, the unit 15 acquires the requested parsed data from the XMLDB 11.

The query processing unit 16 analyzes a query character string designated by the retrieval request. Specifically, the query character string is expressed in an XPath scheme or an XQuery scheme in which the parsed data stored in the XMLDB 11 is to be retrieved. These schemes are general query languages that are commonly known and opened to public by the World Wide Web Consortium (W3C). These languages are originally used to process the parsed data. However, the first embodiment of the present invention adopts a data storage method in which the parsed data of an XML document is stored in the XMLDB 11. In the structured document management system 10 shown in FIG. 1, the XPath or XQuery scheme can be used as a language for retrieving data stored in the XMLDB 11. The storage location managing unit 17 manages information of a storage location of the parsed data in the XMLDB 11 as storage location information.

The request processing unit 12, structured document updating unit 13, parse processing unit 14, structured document referring unit 15, query processing unit 16 and storage location managing unit 17 can be implemented by a specific software program (e.g., structured document management program) installed in a computer (e.g., database server computer). If the software program is read and executed by (the CPU of) the computer, the operations of the units 13 to 17 are performed by the computer. This program can be stored in a computer-readable storage medium in advance and distributed. The program can be downloaded (distributed) via a network.

The concept of storage of XML documents in the XMLDB 11 will be described referring to FIGS. 2 to 6 in sequence. The feature of the XMLDB 11 in the first embodiment lies in that an XML document is not stored in text format or binary format unique to the system but parsed data, which is obtained by parsing an XML document, is stored in the XMLDB 11 with a tree structure.

Figure 2:
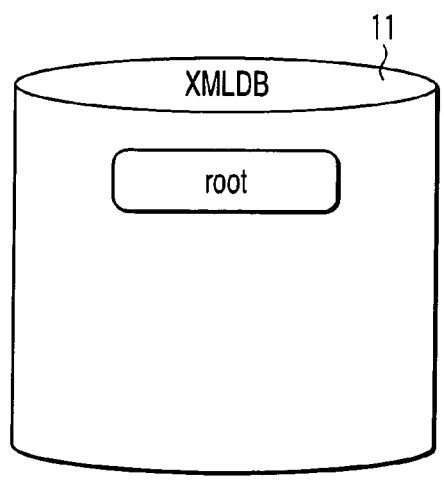
FIG. 2 is a diagram showing an XMLDB that stores no XML documents but has a logical hierarchical structure that is called a "root" node corresponding to the root of a tree structure.

FIG. 2 shows the XMLDB 11 that stores no XML documents. The XMLDB 11 only has a logical hierarchical structure that is called a "root" node corresponding to the root of a tree structure. The logical hierarchical structure, or the "root" node has a function of storing parsed data items corresponding to a plurality of XML documents together.

Figure 3:
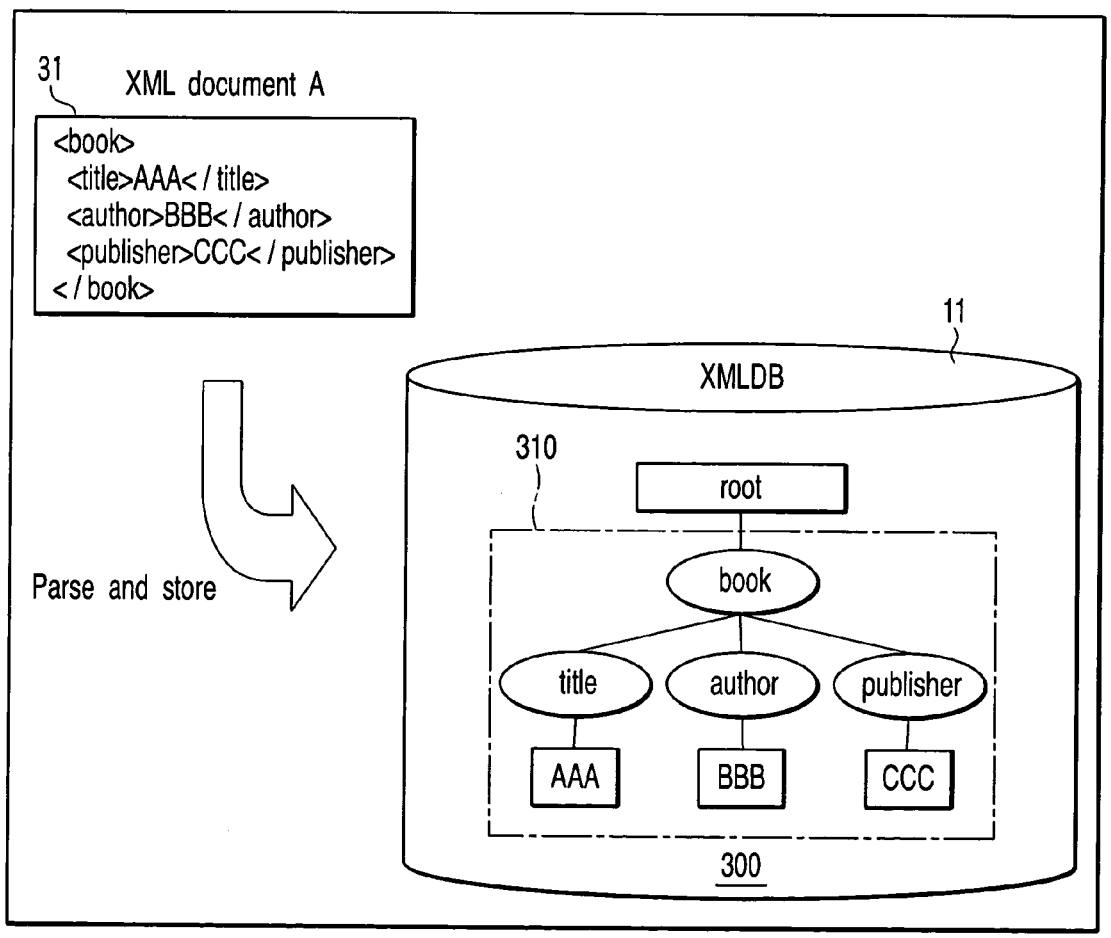
FIG. 3 is a diagram of the XMLDB shown in FIG. 2, to which the parsed data of an XML document A is added.

FIG. 3 shows the XMLDB of FIG. 2, to which the parsed data (parsed XML document) 310 of an XML document (XML document A) 31 is added. In FIG. 3, the XML document (A) 31 is converted into the parsed data 310 and stored under the "root" node. The "root" node and a book ("book" node) that is the uppermost tag (uppermost node) of the XML document (A) 31 are associated with each other so as to have a parent-child relationship in the tree structure (the "root" node is a parent). In the XMLDB 11, the parsed data 310 is managed as a partial tree in the tree structure having a "root" node as the root thereof. This tree structure is considered to be a tree structure of a single virtual XML document 300.

Figure 5:
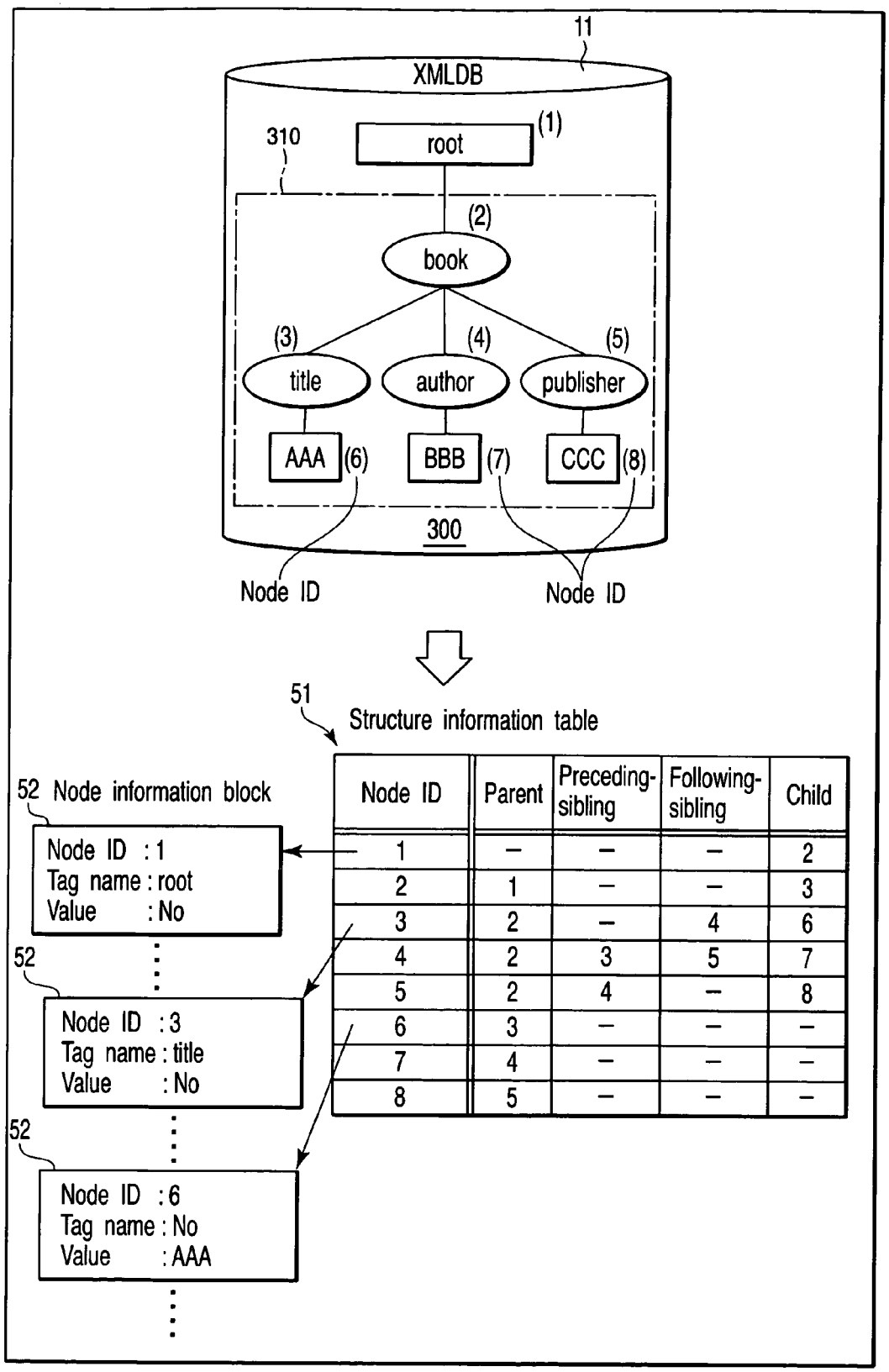
FIG. 5 is a diagram showing an example of a data structure of the XMLDB shown in FIG. 3.

FIG. 5 shows an example of a data structure of the XMLDB 11 of FIG. 3, which stores the parsed data (parsed XML document) 310 of the XML document (A) 31. In this example, the parsed data 310 is a single partial tree in the tree structure of the virtual XML document 300.

The XMLDB 11 stores a data structure of each of XML documents. The data stored in the XMLDB 11 is managed for each of nodes (elements) that constitute a tree structure. A unique number, or a node ID is therefore assigned to each of the nodes. As shown in FIG. 5, the XMLDB 11 stores a structure information table 51 for managing the tree structure of the virtual XML document 310 for each of the nodes (elements) of the tree structure and node information blocks 52 for managing information (node information) of each of the nodes (elements). The number of entries of the table 51 is equal to that of nodes of the tree structure of the XML document 310, as is the number of node information blocks 52.

The i-th (i=1, 2, . . . ) entry of the structure information table 51 is formed of fields that specify a node ID (ID=i) of node i, that of a parent node of node i, that of a preceding-sibling node of node i, that of a following-sibling node of node i and that of a child node of node i. In other words, each of entries of the table 51 is used to hold information (structure information) indicating a relationship in location in the tree structure of a node corresponding to the entry. If the node i does not include a parent node, a preceding-sibling node, a following-sibling node or a child node, a specific value ("-" in FIG. 5), which indicates that there is no corresponding node, is set in its corresponding field of the i-th entry in the structure information table 51.

In the first embodiment, when the node i includes a plurality of child nodes, only the node ID of the eldest son node is set in the field of the child node of the i-th entry of the structure information table 51. For example, the child nodes of a "book" node of node ID 2 are a "title" node corresponding to node ID 3, an "author" node corresponding to node ID 4 and a "publisher" node corresponding to node ID 5. The "title" node indicates the eldest son. The node ID 3 of the "title" node is set in the field of the child nodes of the second entry of the table 51.

Each of the node information blocks 52 is used to hold information (node information) unique to its corresponding node. Each of the blocks 52 holds a node ID, a tag name of the node and a value (element value) of the node. The locations of the blocks 52 stored in the XMLDB 11 are indicated by storage location information (block pointer information). Assume in the first embodiment that the storage location information of the node information block 52 of node i is set in a field (node ID field) of the node ID contained in the i-th entry in the structure information table 51 such that the information and the node ID are pared with each other. Needless to say, each of the entries in the table 51 can have its dedicated field in which the storage location information is set.

The information (structure information) of each of entries in the structure information table 51 and the node information block 52 corresponding to the entry are created when the parsed data of an XML document (parsed XML document) is stored in the XMLDB 11. Note that an XML document is not stored in the XMLDB 11 in text format or binary format unique to the system in the first embodiment. In other words, the parsed data of an XML document (parsed XML document) is stored in the XMLDB 11 as a partial tree of the tree structure having a "root" node as the root thereof. More specifically, both information (structure information) indicative of the location of each node (element) of an XML document in the tree structure and information (node information) unique to each node of the XML document are stored in the XMLDB 11. For the sake of brevity, storing the structure information and node information about the parsed data of an XML document (parsed XML document) in the XMLDB 11 may sometimes be described as storing the parsed data of an XML document (parsed XML document) in the XMLDB 11.

Figure 4:
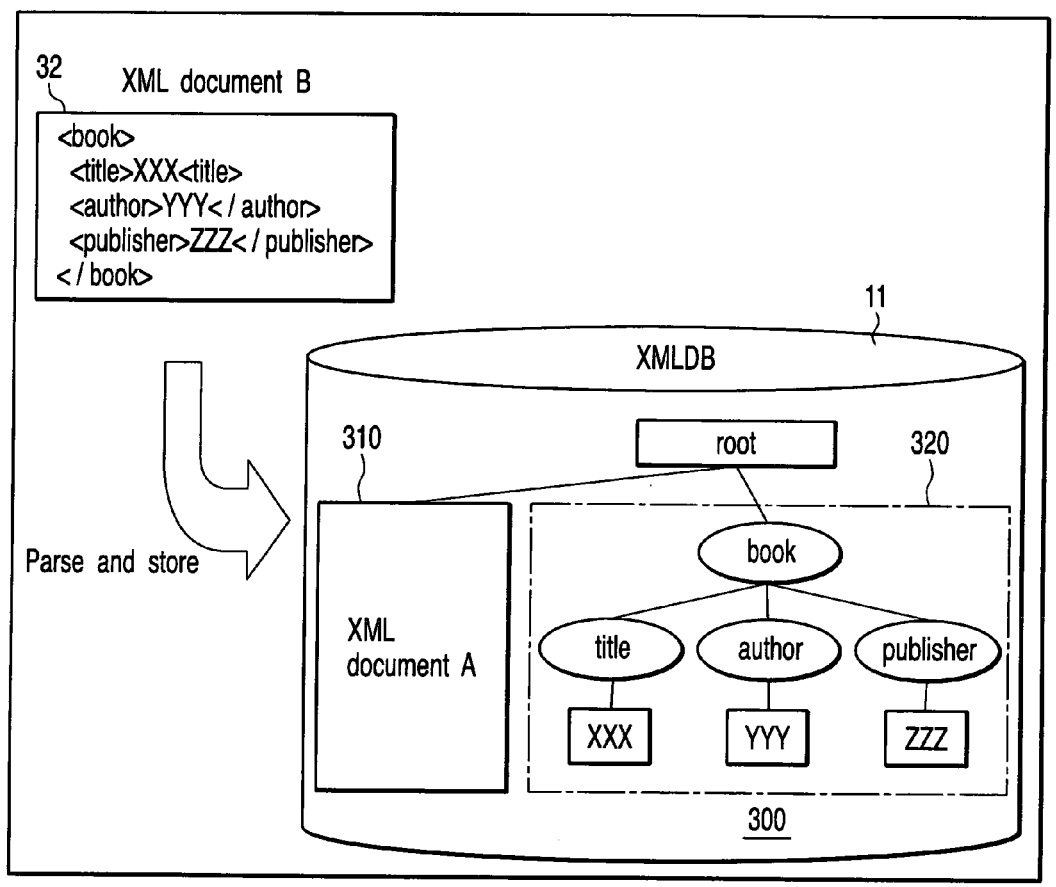
FIG. 4 is a diagram of the XMLDB shown in FIG. 3, to which the parsed data of an XML document B is added.

FIG. 4 shows the XMLDB 11 of FIG. 3, to which the parsed data 320 of the XML document (B) 32 is added. Like the XML document (A) 31, the XML document (B) 32 is converted into the parsed data (parsed XML document) 320 and stored under the "root" node. The "root" node and a book ("book" node) that is the uppermost tag (uppermost node) of the XML document (B) 32 are associated with each other so as to have a parent-child relationship in the tree structure (the "root" node is a parent). In the XMLDB 11, the parsed data 320 is managed as a partial tree in the tree structure having a "root" node as the root thereof, like the parsed data (parsed XML document) 310.

FIG. 6 shows an example of a data structure of the XMLDB 11 of FIG. 4, in which the parsed data (parsed XML document) 320 of the XML document (B) 32 is stored after the parsed data (parsed XML document) 310 of the XML document (A) 31. In this example, the parsed data 310 and 320 are each stored in the XMLDB 11 as a partial tree in the tree structure (of the virtual XML document 300) having a "root" node as the root thereof. In other words, all the parsed data (parsed XML documents) stored in the XMLDB 11 has a single tree structure.

In FIG. 6, the uppermost node of the parsed data (parsed XML document) 320 is a "book" node to which "9" is assigned as a node ID. This "book" node is associated with the following-sibling node of a "book" node to which "2" is assigned as a node ID in the parsed data (parsed XML document) 310. Thus, the field of the following-sibling node of the second entry in the structure information table 51, which corresponds to the "book" node of node ID 2, is updated from "-" indicating no following-sibling nodes (see FIG. 5) to the node ("book" node) of node ID 9. When the parsed data 320 is stored in the XMLDB 11, the entries whose number (seven in this embodiment) coincides with that of nodes of the parsed data 320, are added to the structure information table 51.

The following processes (1-1) to (1-4) of the structured document management system 10 shown in FIG. 1 will be described in sequence.

(1-1) Storage Process

Figure 7:
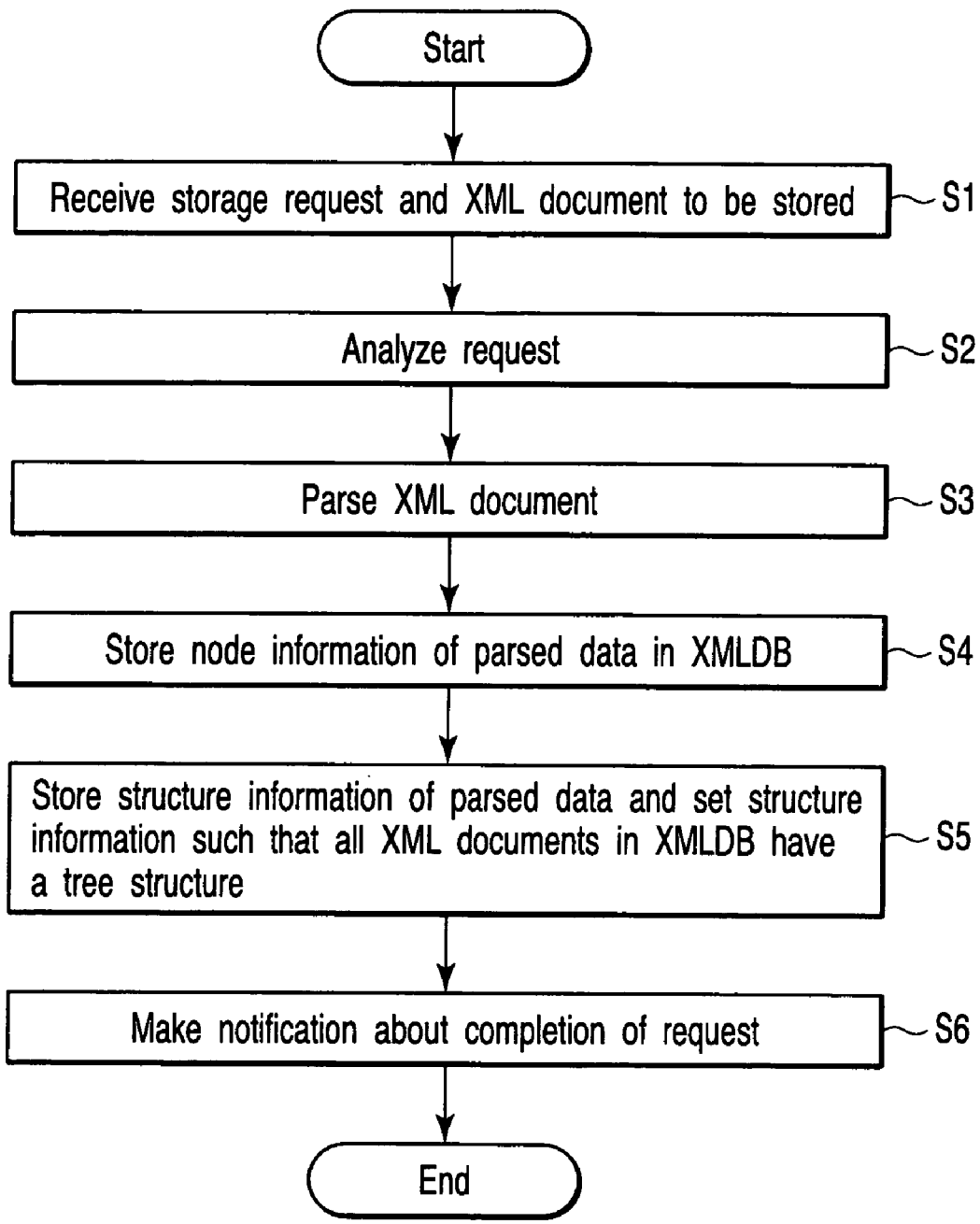
FIG. 7 is a flowchart showing a procedure of a storage process in the structured document management system.

A procedure of the storage process performed by the structured document management system 10 will be first described with reference to the flowchart shown in FIG. 7.

Assume now that the application 21 of the client's terminal 20 issues an XML document storage request to the system 10. The request processing unit 12 in the system 10 receives the storage request and an XML document to be stored from the application 21 (step S1).

The request processing unit 12 analyzes the received storage request (step S2) and sends the received XML document to the structured document updating unit 13. The unit 13 sends the XML document to the parse processing unit 14. The parse processing unit 14 parses the XML document (step S3) and checks whether the XML document is grammatically correct or not. If it is correct, the unit 14 returns the parsed data, which is obtained by parsing the XML document, to the unit 13. If not, the system 10 notifies the application 21 that the XML document is not correct grammatically.

The structured document updating unit 13 stores the node information of each node of the parsed data (parsed XML document) obtained from the parse processing unit 14 in the XMLDB 11 in the format of the node information blocks 52 having a data structure as shown in FIG. 5 or 6 (step S4). In other words, the unit 13 acquires the node information of each node of the received XML document from the parsed data of the received XML document and stores it in the XMLDB 11. The unit 13 sends both the parsed data and the storage location information indicating the storage location of a node information block 52, which holds the node information of the parsed data, in the XMLDB 11 to the storage location managing unit 17.

The storage location managing unit 17 adds entries to the structure information table 51 stored in the XMLDB 11 and stores the structure information in the added entries (step S5). The structure information has a data structure as shown in FIG. 5 or 6. In other words, the unit 17 extracts a parent-child and sibling relationship of each node of the received XML document to be stored from the parsed data of the received XML document and stores structure information indicative of the extracted relationship in the XMLDB 11.

In step S5, the storage location managing unit 17 sets the structure information in a corresponding entry in the structure information table 51 so as to have a parent-child relationship between the uppermost node of the received XML document to be stored (referred to as node X hereinafter) and the "root" node (the "root" node is a parent). If at least one XML document has already been stored in the XMLDB 11 in step S4, the unit 17 sets the structure information so as to have a sibling relationship between the uppermost node of an XML document stored in the XMLDB 11 most recently and the node X (the node X is a following-sibling).

When the storage location managing unit 17 stores the structure information of the parsed data, it sets the structure information such that all XML documents (parsed XML documents) in the XMLDB 11 have a single tree structure. After that, the unit 17 notifies the structured document updating unit 13 of the completion of the request. The unit 13 notifies the request processing unit 12 of the completion. The unit 12 notifies the application 21 of the client's terminal 20 of the completion via the network N (step S6).

The XML document storage process has been described above. The most characteristic step in this storage process is step S5. In step S5, each of all XML documents (parsed XML documents) stored in the XMLDB 11 forms a partial tree in a single tree structure (virtual XML document 300).

(1-2) Retrieval Process

Figure 8:
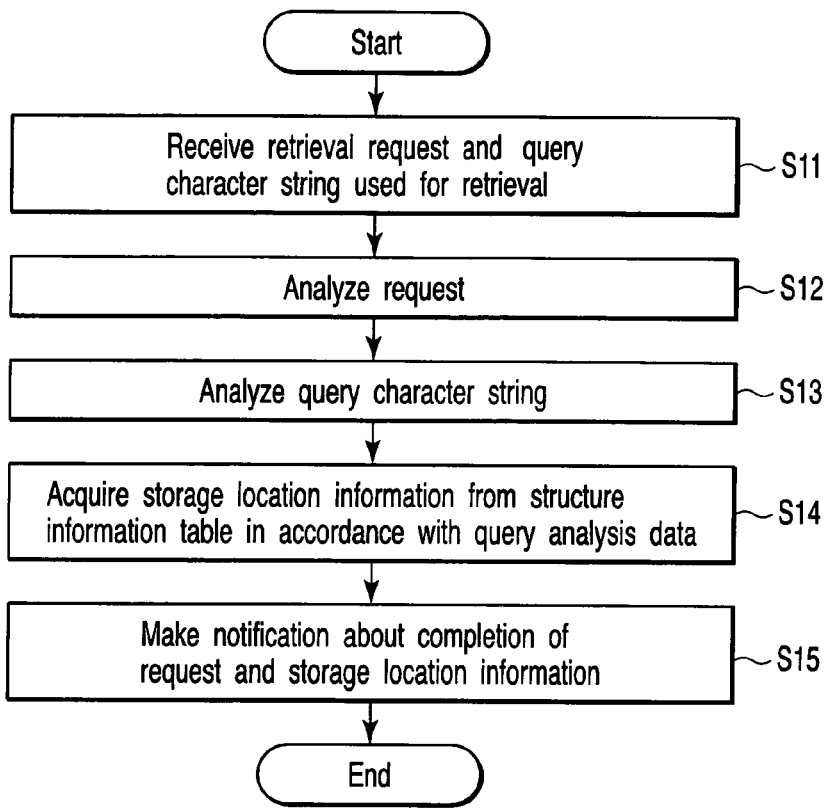
FIG. 8 is a flowchart showing a procedure of a retrieval process in the structured document management system.

A procedure of the retrieval process performed by the structured document management system 10 will now be described with reference to the flowchart shown in FIG. 8.

Assume now that the application 21 of the client's terminal 20 issues an XML document retrieval request to the system 10. The request processing unit 12 receives the retrieval request and a query character string for retrieval from the application 21 (step S11).

The request processing unit 12 analyzes the received retrieval request (step S12) and sends the query character string to the structured document referring unit 15. The unit 15 sends the query character string to the query processing unit 16 and requests it to analyze the query character string. The query processing unit 16 analyzes the query character string (step S13). In step S13, the query processing unit 16 checks whether the analyzed query character string is grammatically correct or not. If it is correct, the unit 16 returns analysis data (query analysis data) indicating the analysis result of the query character string to the unit 15. If not, the application 21 is notified that the query character string is not correct grammatically.

The structured document referring unit 15 sends the returned query analysis data to the storage location managing unit 17. The query analysis data includes a pass (location pass) to a node to be retrieved (e.g., the uppermost node of the XML document). The unit 17 acquires storage location information corresponding to the query analysis data, or storage location information corresponding to the node ID of a node specified by the pass included in the query analysis data from the structure information table 51 stored in the XMLDB 11 in accordance with the query analysis data (step S14). The unit 17 notifies the parse processing unit 14 of the acquired storage location information together with the completion of the request. The parse processing unit 14 notifies the application 21 of the client's terminal 20 of the acquired storage location information and the completion of the request through the request processing unit 12 and network N (step S15).

The application 21 can thus acquire the storage location information of node information (node information of the parsed data) of a node that meets to the retrieval condition represented by the query character string designated by the retrieval request. Using the storage location information, the application 21 can issue a parsed data acquisition request or a parsed data change request, which will be described later, to the structured document management system 10 to acquire or change (update) the parsed data (node information held in the node information block 52) designated by the storage location information. Not only the storage location information, but also the node information of a node that meets the retrieval condition represented by the query character string designated by the retrieval request, or the parsed data corresponding to data of the XML document that meets the retrieval condition can be returned to the application 21 of the client's terminal 20.

The storage location information indicative of the storage location of node information unique to node i is included in the structure information unique to the node i (entry information in the structure information table 51) together with the node ID of the node i. The storage location information corresponding to the node i can thus be acquired referring to the table 51 using the node ID of the node i. The node ID of the node specified by the pass represented by the query analysis data can be acquired in step S14, and the application 21 can be notified of the acquired ID in step S15.

(1-3) Parsed Data Acquisition Process

Figure 9:
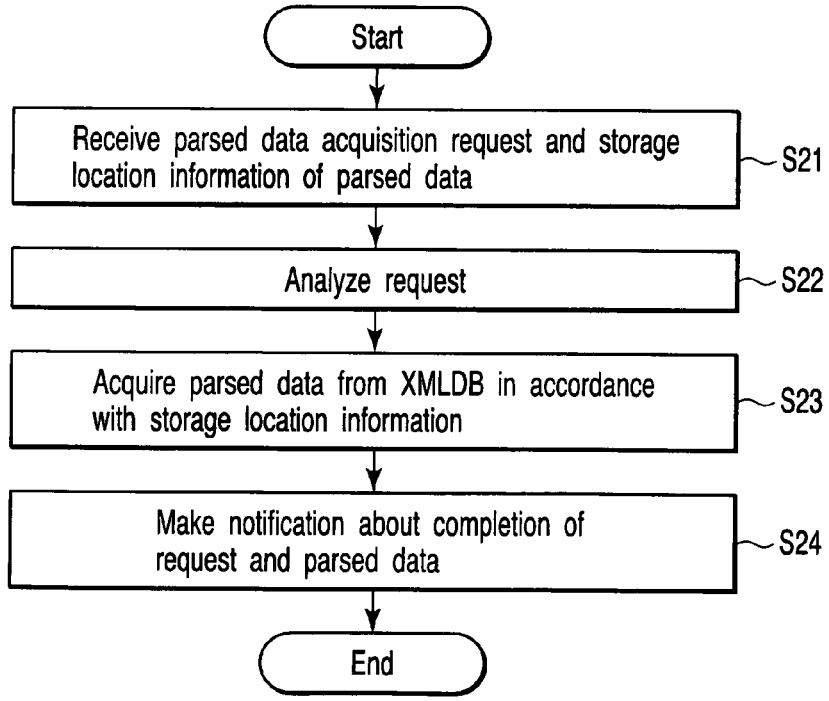
FIG. 9 is a flowchart showing a procedure of a parsed data acquisition process in the structured document management system.

A procedure of the parsed data acquisition process performed by the structured document management system 10 will now be described with reference to the flowchart shown in FIG. 9.

Assume now that the application 21 of the client's terminal 20 issues a parsed data acquisition request to the system 10. The request processing unit 12 in the system 10 receives the parsed data acquisition request and storage location information of parsed data to be acquired from the application 21 (step S21). This storage location information is information that the application 21 obtains from the system 10 through the retrieval process of the system 10 performed at the retrieval request of the application 21.

The request processing unit 12 analyzes the received parsed data acquisition request (step S22) and sends the storage location information to the structured document referring unit 15. The unit 15 acquires parsed data from the XMLDB 11 in accordance with the storage location information (step S23). The unit 15 notifies the request processing unit 12 of the acquired parsed data together with the completion of the request. The unit 12 notifies the application 21 of the client's terminal 20 of the acquired parsed data and the completion of the request via the network N (step S24).

(1-4) Parsed Data Change Process

Figure 10:
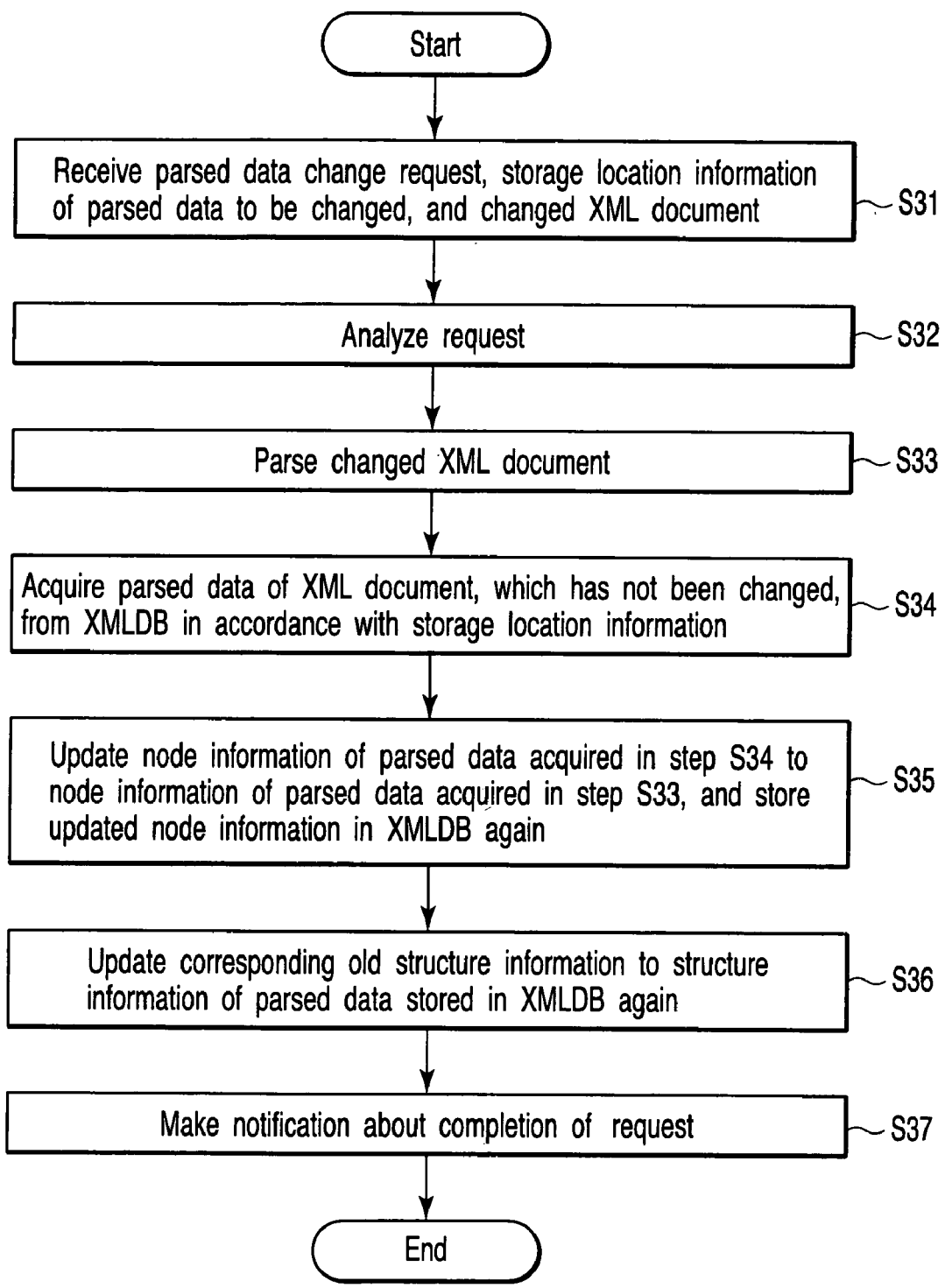
FIG. 10 is a flowchart showing a procedure of a parsed data change process in the structured document management system.

A procedure of the parsed data change process performed by the structured document management system 10 will now be described with reference to the flowchart shown in FIG. 10.

Assume now that the application 21 of the client's terminal 20 issues a parsed data change request to the system 10. The request processing unit 12 receives the parsed data change request, storage location information of parsed data of a XML document to be changed, and the changed XML document from the application 21 (step S31). This storage location information is information that the application 21 obtains from the system 10 through the retrieval process of the system 10 performed at the retrieval request of the application 21. Assume here that the storage location information indicates the location of the node information of "book" node ("book" tag) of the XML document (A) 31. Also, assume that the changed XML document is an XML document C.

The request processing unit 12 analyzes the received parsed data change request (step S32) and sends the changed XML document C to the structured document updating unit 13. The unit 13 sends the XML document C to the parse processing unit 14. The parse processing unit 14 parses the XML document C (step S33). In step S33, the parse processing unit 14 checks whether the XML document C is grammatically correct or not. If it is correct, the parse processing unit 14 returns the parsed data to the unit 13.

The structured document updating unit 13 acquires the parsed data (i.e., the parsed data of the XML document (A) that has not been changed) from the XMLDB 11 based on the storage location information sent from the request processing unit 12 (step S34).

The unit 13 updates the node information of the parsed data of the XML document acquired in step S34 to that of the parsed data obtained by parsing the XML document C by the parse processing unit 14 in step S33 (step S35). In step S35, the unit 13 stores the updated parsed data (i.e., updated node information) again in the original storage location of the XMLDB 11. The unit 13 sends the updated parsed data stored again in the XMLDB 11 and the storage location information indicating the storage location of the updated parsed data in the XMLDB 11 to the storage location managing unit 17.

The storage location managing unit 17 updates the old structure information in the XMLDB 11 to the structure information of the updated parsed data stored again in the XMLDB 11 by the unit 13 (step S36). Thus, the parsed data of the XML document A stored in the XMLDB 11 before the application 21 requests the parsed data to be changed is replaced with that of the XML document C.

After that, the unit 17 notifies the unit 13 of the completion of the request. The unit 13 notifies the request processing unit 12 of the completion of the request. The unit 12 notifies the application 21 of the client's terminal 20 of the completion of the request via the network N (step S37).

As described above, the parsed data obtained by parsing an XML document is stored in the XMLDB 11 in the first embodiment. The application 21 (client's terminal 20) can acquire the parsed data from the XMLDB 11 as data of the XML document by issuing a data acquisition request (parsed data acquisition request) to the structured document management system 10. The application 21 (or the structured document management system 10) need not perform a high-load parse process for the data acquired from the XMLDB 11, thereby achieving a high-speed operation. This advantage becomes big particularly when the same data is acquired two or more times from the XMLDB 11.

In the first embodiment, the parsed data of each XML document is managed as part (partial tree) of the tree structure of a single virtual XML document. Therefore, XML documents that are originally separated into a plurality of files the number of which is the same as that of XML documents can be retrieved by one operation. For the same reason, such XML documents can be acquired or deleted by one operation.

Second Embodiment

Figure 11:
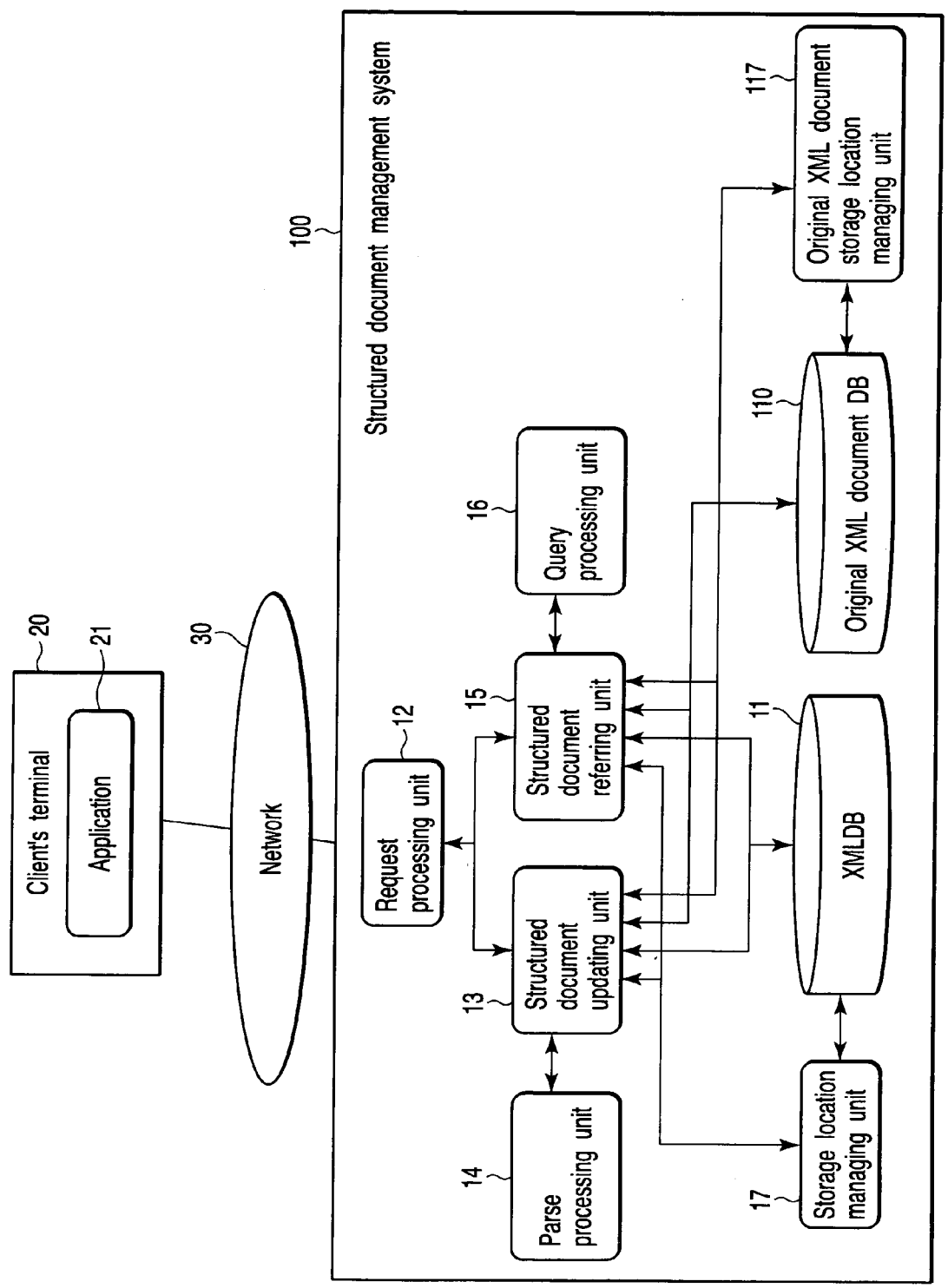
FIG. 11 is a block diagram showing a configuration of a structured document management system according to a second embodiment of the present invention.

FIG. 11 is a block diagram showing a configuration of a structured document management system 100 according to a second embodiment of the present invention. In FIG. 11, the same elements as those in FIG. 1 are each denoted by the same reference numeral.

The structured document management system 100 shown in FIG. 11 differs from the system 10 shown in FIG. 1 in that an original XML document DB (original XML document database) 110 and an original XML document storage location managing unit 117 are added. The DB 110 stores the original XML document (e.g., text-format XML document) corresponding to the parsed data stored in the XMLDB 11. The unit 117 manages information of the storage location (storage location information) in the DB 110 that stores the original XML document and that in the XMLDB 11 that stores the parsed data so as to correspond to each other.

The following processes (2-1) and (2-2) of the structured document management system 100 shown in FIG. 11 will be described in sequence. The retrieval process and parsed data acquisition process of the system 100 are the same as those of the system 10.

(2-1) Storage Process

Figure 12:
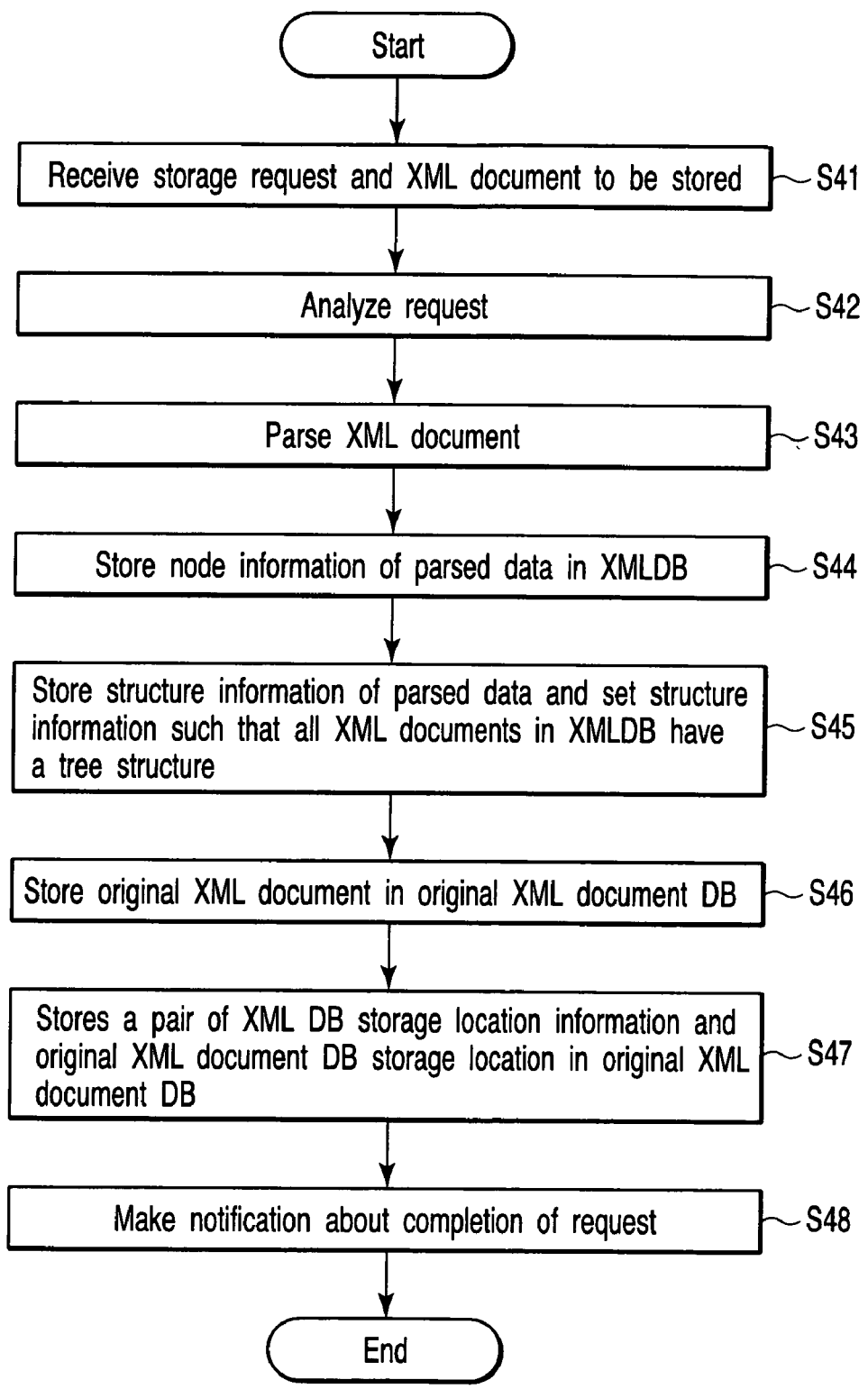
FIG. 12 is a flowchart showing a procedure of a storage process in the structured document management system.

A procedure of the storage process performed by the structured document management system 100 will be first described with reference to the flowchart shown in FIG. 12.

Assume now that the application 21 of the client's terminal 20 issues an XML document storage request to the system 100. The system 100 performs the same processes (steps S41 to S45) as those of steps S1 to S5 shown in FIG. 7. Node information acquired from the parsed data of an XML document to be stored is stored in the XMLDB 11. Structure information, indicating a parent-child and sibling relationship of each node, extracted from the parsed data is stored in the XMLDB 11 and set in such a manner that all XML documents (parsed XML documents) in the XMLDB 11 have a single tree structure.

The structured document updating unit 13 stores an XML document that has not been parsed by the parse processing unit 14, or an XML document (text-format XML document) that is an original of the parsed data stored in the XMLDB 11 in the original XML document DB 110 (step S46).

The unit 13 supplies the original XML document storage location managing unit 17 with both storage location information (XMLDB storage location information) indicating the storage location of the parsed data in the XMLDB 11 and storage location information (original XML document DB storage location information) indicating the storage location of the original XML document in the original XML document DB 110. The unit 117 stores the paired XMLDB storage location information and original XML document DB storage location information, which are received from the unit 13, in the original XML document DB 110 (step S47). The unit 117 notifies the unit 13 of the completion of the request. The unit 13 notifies the request processing unit 12 of the completion of the request. The unit 12 notifies the client's terminal 20 of the completion of the request via the network N (step S48).

(2-2) Original XML Document Acquisition Process

Figure 13:
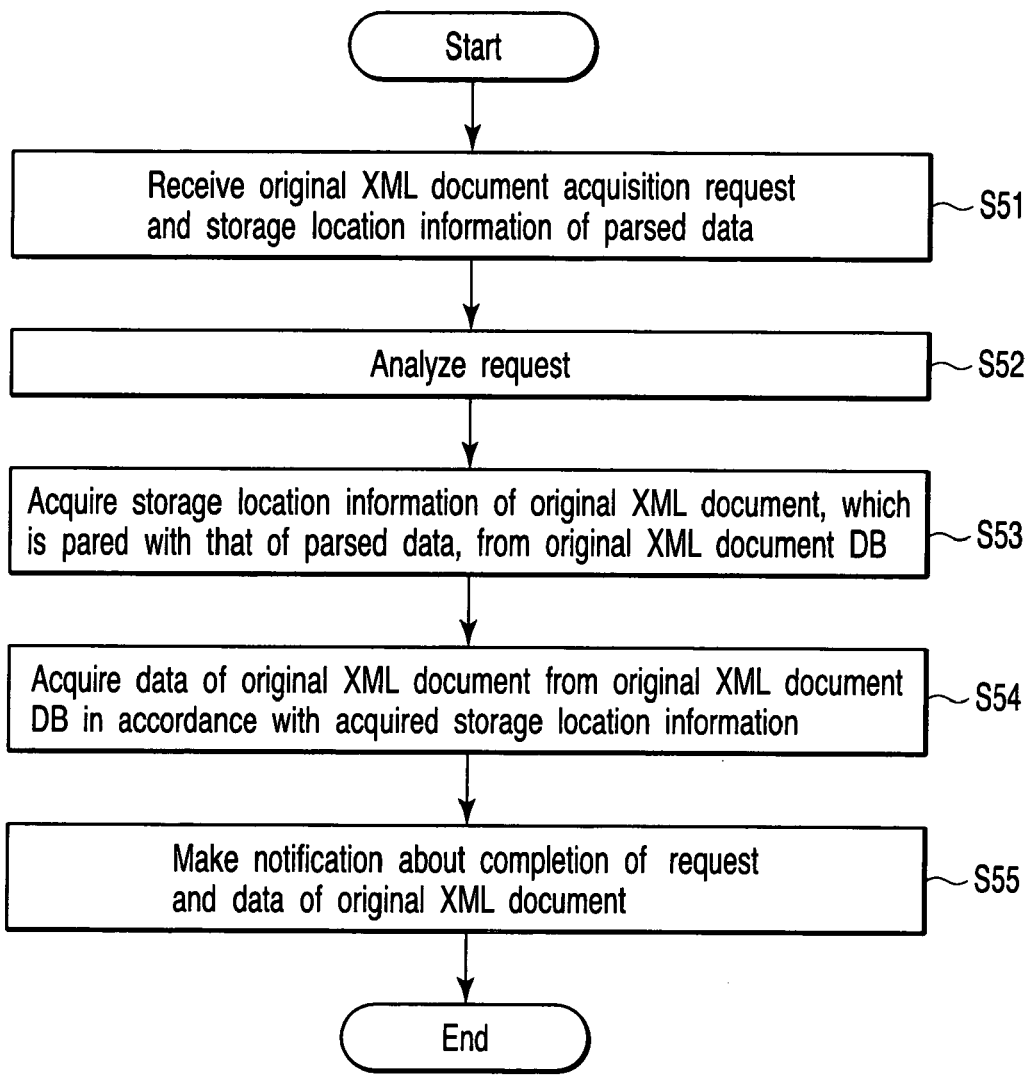
FIG. 13 is a flowchart showing a procedure of an original XML document acquisition process in the structured document management system.

A procedure of the original XML document acquisition process performed by the structured document management system 100 will be first described with reference to the flowchart shown in FIG. 13.

Assume now that the application 21 of the client's terminal 20 issues an original XML document acquisition request to the system 100. The request processing unit 12 in the system 100 receives the original XML document acquisition request and storage location information of the parsed data from the application 21 (step S51). This storage location information indicates a location of the parsed data corresponding to the original XML document to be acquired in the XMLDB 11.

The request processing unit 12 analyzes the received original XML document acquisition request (step S52) and sends the storage location information of the parsed data to the structured document referring unit 15. The unit 15 sends the storage location information to the original XML document storage location managing unit 117. The unit 117 acquires the storage location information of the original XML document, which is pared with the storage location information of the parsed data, referring to the original XML document DB 110 based on the storage location information of the parsed data (step S53). The unit 117 notifies the unit 15 of the storage location information of the acquired original XML document.

The unit 15 acquires data of the original XML document from the original XML document DB 110 in accordance with the storage location information of the original XML document of which the unit 15 is notified by the unit 117 (step S54). The unit 15 notifies the request processing unit 12 of the data of the acquired original XML document together with the completion of the request. The unit 12 notifies the application 21 of the client's terminal 20 of the completion of the request and the data of the acquired original XML document through the network N (step S55).

As described above, not only the parsed data of an XML document is stored in the XMLDB 11, but also the original XML document corresponding to the parsed data is stored in the original XML document DB 110 in the second embodiment. Further, the storage location information indicating the storage location of the parsed data and the storage location information indicating the storage location of the original XML document are stored and managed by the original XML document storage location managing unit 117 so as to correspond to each other. In addition to the advantage of the first embodiment, the second embodiment has the advantage that the original of the XML data stored in the XMLDB 11 can be guaranteed. In the second embodiment, it is possible to determine which of the parsed data and the original XML document is retrieved or acquired in accordance with the contents and characteristics of the process.

In the above first and second embodiments, the XMLDB 11 stores the parsed data that is obtained by parsing a structured document. In reply to the structured document acquisition request (retrieval of a structured document or acquisition of data) of a client, therefore, the parsed data is acquired (retrieved) from the XMLDB 11 as data of a structured document that meets the request and returned to the client. Thus, the client (the application running on the client) or the structured document management systems 10 and 100 need not parse the acquired structured document. Whenever a structured document that meets the request is acquired from the XMLDB 11, the client or the structured document management systems 10 and 100 need not parse the acquired structured document.

The parsed data of a structured document is stored in the XMLDB 11 as a partial tree of the tree structure of a single virtual structured document. The each of nodes (elements) contained in the parsed data corresponding to each of all the structured documents stored in the XMLDB 11 is unique in a single tree structure in the XMLDB 11. Therefore, a client can transparently retrieve and update all the structured documents stored in the XMLDB 11 without being conscious of a difference between files.

The systems of the first and second embodiments have a query language processing function of analyzing a general query language to process the parsed data. A client need not use a dedicated language for acquiring (retrieving) a structured document but can use an accustomed language. The development productivity can thus be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured document management system which manages a structured document database, comprising:

parsing means for parsing a structured document to be stored in accordance with a structured document storage request made by a client;

structured document storing means for storing parsed data obtained by parsing the structured document in the structured document database, the parsed data being stored in the structured document database as a partial tree of a tree structure of a single virtual structured document, wherein the structured document database includes a structure information table including a plurality of entries corresponding to the nodes of the single virtual structured document, each of the entries storing a parent node ID, a child node ID, a preceding-sibling node ID, and a following-sibling node ID of a node of the single virtual structured document, and a plurality of node information blocks storing node information for one or more nodes of the single virtual structured document, the structured document storing means including:

(a) first storing means for acquiring node information of each node of the structured document from the parsed data obtained by parsing the structured document, and storing the node information in a node information block of the structured document database;

(b) second storing means for extracting a parent node ID, a child node ID, a preceding-sibling node ID, and a following-sibling node ID of each of the nodes from the parsed data obtained by parsing the structured document, and storing structure information for indicating the extracted parent node ID, child node ID, preceding-sibling node ID, and following-sibling node ID in an entry of the structure information table of the structured document database;

(c) parent-child relationship setting means for setting the structure information so as to have a parent-child relationship between a root node of the tree structure of the single virtual structured document and an uppermost node of the parsed data obtained by parsing the structured document, wherein the parent-child relationship setting means stores, in an entry of the structure information table which corresponds to the uppermost node, a node ID of the root node as the parent node ID of the uppermost node; and (d) sibling relationship setting means for, if another parsed data corresponding to another structured document is stored in the structured document database by the structured document storing means, setting the structure information so as to have a sibling relationship between the uppermost node of the parsed data obtained by parsing the structured document and an uppermost node of the another parsed data, wherein the sibling relationship setting means stores, in an entry of the structure information table which corresponds to the uppermost node of the another parsed data, a node ID of the uppermost node of the parsed data obtained by parsing the structured document as the following-sibling node ID of the uppermost node of the another parsed data, and stores, in the entry of the structure information table which corresponds to the uppermost node of the structure information table which corresponds to the uppermost node of the parsed data obtained by parsing the structured document, a node ID of the uppermost node of the another parsed data as the preceding-sibling node ID of the uppermost node of the parsed data obtained by parsing the structured document;

structured document acquiring means for acquiring parsed data corresponding to data of a structured document, which meets to a structured document acquisition request made by the client, from the structured document database; and request processing means for returning the parsed data acquired by the structured document acquiring means to the client.

2. The structured document management system according to claim 1, wherein the structured document storing means includes means for storing an original structured document that has not been parsed in an original structured document database, the original structured document corresponding to the parsed data stored in the structured document database by the structured document storing means.

3. The structured document management system according to claim 2, wherein the structured document acquiring means includes means for acquiring data of the original structured document from the original structured document database in accordance with an original structured document acquisition request made by the client.

4. The structured document management system according to claim 3, further comprising original structured document storage location managing means for storing first storage location information and second storage location information in the original structured document database so as to correspond to each other, the first storage location information indicating a storage location of the parsed data in the structured document database, and the second storage location information indicating a storage location of the original structured document in the original structured document database, and wherein the original structured document storage location managing means acquires the second storage location information corresponding to the first storage location information from the original structured document database when the client makes an original structured document acquisition request including the first storage location information; and the structured document acquiring means acquires the data of the original structured document from the original structured document database in accordance with the second storage location information acquired by the original structured document storage location managing means.

5. The structured document management system according to claim 1, further comprising storage location managing means for acquiring first storage location information from the structured document database in accordance with a structured document retrieval request made by the client, the first storage location information indicating a storage location of parsed data that meets to the structured document retrieval request in the structured document database, and wherein the request processing means includes means for returning the first storage location information acquired by the storage location managing means to the client as a retrieval result obtained in response to the structured document retrieval request.

6. The structured document management system according to claim 1, further comprising query language processing means for analyzing a general query language for processing the parsed data, and wherein the structured document acquisition request includes the general query language, and the structured document acquiring means includes means for causing the query language processing means to analyze the general query language included in the structured document acquisition request, and acquiring parsed data, which meets to a request indicated by an analysis result, from the structured document database.

7. A structured document management method of managing a structured document database in a structured document management system, wherein the structured document database includes a structure information table including a plurality of entries corresponding to the nodes of a single virtual structured document, each of the entries storing a parent node ID, a child node ID, a preceding-sibling node ID, and a following-sibling node ID of a node of a single virtual structured document, and a plurality of node information blocks storing node information for one or more nodes of the single virtual structured document, the method comprising:

parsing a structured document to be stored in accordance with a structured document storage request made to the structured document management system by a client;

performing a storing process for storing parsed data obtained by parsing the structured document in the structured document database, the parsed data being stored in the structured document database as a partial tree of a tree structure of the single virtual structured document, the storing process including:

(a) a first process for acquiring node information of each node of the structured document from the parsed data obtained by parsing the structured document, and storing the node information in a node information block of the structured document database;

(b) a second process for extracting a parent node ID, a child node ID, a preceding-sibling node ID, and a following-sibling node ID of each of the nodes from the parsed data obtained by parsing the structured document, and storing structure information for indicating the extracted parent node ID, child node ID, preceding-sibling node ID, and following-sibling node ID in an entry of the structure information table of the structured document database;

(c) a third process for setting the structure information so as to have a parent-child relationship between a root node of the tree structure of the single virtual structured document and an uppermost node of the parsed data obtained by parsing the structured document, wherein the parent-child relationship setting means stores, in an entry of the structure information table which corresponds to the uppermost node, a node ID of the root node as the parent node ID of the uppermost node; and (d) a fourth process for, if another parsed data corresponding to another structured document is stored in the structured document database by the storing process, setting the structure information so as to have a sibling relationship between the uppermost node of the parsed data obtained by parsing the structured document and an uppermost node of the another parsed data, wherein the sibling relationship setting means stores, in an entry of the structure information table which corresponds to the uppermost node of the another parsed data, a node ID of the uppermost node of the parsed data obtained by parsing the structured document as the following-sibling node ID of the uppermost node of the another parsed data, and stores, in the entry of the structure information table which corresponds to the uppermost node of the structure information table which corresponds to the uppermost node of the parsed data obtained by parsing the structured document, a node ID of the uppermost node of the another parsed data as the preceding-sibling node ID of the uppermost node of the parsed data obtained by parsing the structured document;

acquiring parsed data corresponding to data of a structured document, which meets to a structured document acquisition request made by the client, from the structured document database; and returning the acquired parsed data to the client.

8. The structured document management method according to claim 7, further comprising storing an original structured document that has not been parsed in an original structured document database, the original structured document corresponding to the parsed data stored in the structured document database.

9. The structured document management method according to claim 8, further comprising:

acquiring data of the original structured document from the original structured document database in accordance with an original structured document acquisition request made by the client; and returning the data of the acquired original structured document to the client.

10. A computer-readable storage medium having a program stored thereon for managing a structured document database, wherein the structured document database includes a structure information table including a plurality of entries corresponding to the nodes of a single virtual structured document, each of the entries storing a parent node ID, a child node ID, a preceding-sibling node ID, and a following-sibling node ID of a node of a single virtual structured document, and a plurality of node information blocks storing node information for one or more nodes of the single virtual structured document, the program causes the computer to perform steps comprising:

parsing a structured document to be stored in accordance with a structured document storage request made by a client;

performing a storing process for storing parsed data obtained by parsing the structured document in the structured document database, the parsed data being stored in the structured document database as a partial tree of a tree structure of the single virtual structured document, the storing process including:

(a) a first process for acquiring node information of each node of the structured document from the parsed data obtained by parsing the structured document, and storing the node information in a node information block of the structured document database;

(b) a second process for extracting a parent node ID, a child node ID, a preceding-sibling node ID, and a following-sibling node ID of each of the nodes from the parsed data obtained by parsing the structured document, and storing structure information for indicating the extracted parent node ID, child node ID, preceding-sibling node ID, and following-sibling node ID in an entry of the structure information table of the structured document database;

(c) a third process for setting the structure information so as to have a parent-child relationship between a root node of the tree structure of the single virtual structured document and an uppermost node of the parsed data obtained by parsing the structured document, wherein the parent-child relationship setting means stores, in an entry of the structure information table which corresponds to the uppermost node, a node ID of the root node as the parent node ID of the uppermost node; and (d) a fourth process for, if another parsed data corresponding to another structured document is stored in the structured document database by the storing process, setting the structure information so as to have a sibling relationship between the uppermost node of the parsed data obtained by parsing the structured document and an uppermost node of the another parsed data, wherein the sibling relationship setting means stores, in an entry of the structure information table which corresponds to the uppermost node of the another parsed data, a node ID of the uppermost node of the parsed data obtained by parsing the structured document as the following-sibling node ID of the uppermost node of the another parsed data, and stores, in the entry of the structure information table which corresponds to the uppermost node of the structure information table which corresponds to the uppermost node of the parsed data obtained by parsing the structured document, a node ID of the uppermost node of the another parsed data as the preceding-sibling node ID of the uppermost node of the parsed data obtained by parsing the structured document;

acquiring parsed data corresponding to data of a structured document, which meets to a structured document acquisition request made by the client, from the structured document database; and returning the acquired parsed data to the client.

11. The program according to claim 10, further causes the computer to store an original structured document that has not been parsed in an original structured document database, the original structured document corresponding to the parsed data stored in the structured document database.

12. The program according to claim 11, further causes the computer to perform steps comprising:

acquiring data of the original structured document from the original structured document database in accordance with an original structured document acquisition request made by the client; and returning the data of the original structured document to the client.

13. A structured document management system which manages a structured document database, wherein the structured document database includes a structure information table including a plurality of entries corresponding to the nodes of a single virtual structured document, each of the entries storing a parent node ID, a child node ID, a preceding-sibling node ID, and a following-sibling node ID of a node of a single virtual structured document, and a plurality of node information blocks storing node information for one or more nodes of the single virtual structured document, comprising:

parsing means for parsing the structured document to be stored in accordance with a structured document storage request made by a client;

structured document storing means for storing parsed data obtained by parsing the structured document in the structured document database, the parsed data being stored in the structured document database as a partial tree of a tree structure of a single virtual structured document, the structured document storing means including:

(a) a first storing means for acquiring node information of each node of the structured document from the parsed data obtained by parsing the structured document, and storing the node information in the structured document database;

(b) a second storing means for extracting a parent node ID, a child node ID, a preceding-sibling node ID, and a following-sibling node ID of each of the nodes from the parsed data obtained by parsing the structured document, and storing structure information for indicating the extracted parent node ID, child node ID, preceding-sibling node ID, and following-sibling node ID in an entry of the structure information table of the structured document database;

(c) means for setting the structure information so as to have a parent-child relationship between a root node of the tree structure of the single virtual structured document and an uppermost node of the parsed data obtained by parsing the structured document, wherein the parent-child relationship setting means stores, in an entry of the structure information table which corresponds to the uppermost node, a node ID of the root node as the parent node ID of the uppermost node;

(d) means for, if another parsed data corresponding to another structured document is stored in the structured document database by the structured document storing means, setting the structure information so as to have a sibling relationship between the uppermost node of the parsed data obtained by parsing the structured document and a second uppermost node of the another parsed data corresponding to another structured document, wherein the sibling relationship setting means stores, in an entry of the structure information table which corresponds to the uppermost node of the another parsed data, a node ID of the uppermost node of the parsed data obtained by parsing the structured document as the following-sibling node ID of the uppermost node of the another parsed data, and stores, in the entry of the structure information table which corresponds to the uppermost node of the structure information table which corresponds to the uppermost node of the parsed data obtained by parsing the structured document, a node ID of the uppermost node of the another parsed data as the preceding-sibling node ID of the uppermost node of the parsed data obtained by parsing the structured document; and (e) means for maintaining the tree structure of the single virtual structured document, the tree structure including the two sibling, uppermost nodes obtained by parsing the two structured documents, wherein the two uppermost nodes are root nodes of partial tree structures used to store the two structured documents;

structured document acquiring means for acquiring parsed data corresponding to data of a structured document, which meets to a structured document acquisition request made by the client, from the structured document database; and request processing means for returning the parsed data acquired by the structured document acquiring means to the client.

\* \* \* \* \*